United States Patent [19]

Biczenczuk

[11] Patent Number: 4,960,637
[45] Date of Patent: Oct. 2, 1990

[54] POLYMERIC FILMS

[75] Inventor: Susan Biczenczuk, Bridgwater, England

[73] Assignee: Courtaulds Films & Packaging (Holdings) Ltd., Somerset, England

[21] Appl. No.: 430,375

[22] Filed: Nov. 2, 1989

[30] Foreign Application Priority Data

Nov. 14, 1988 [GB] United Kingdom ................ 8825867

[51] Int. Cl.$^5$ .......................... B32B 3/26; B32B 7/02
[52] U.S. Cl. .............................. 428/314.4; 428/315.5; 428/315.9; 428/317.9; 428/516; 428/910
[58] Field of Search ............... 428/314.4, 315.5, 315.9, 428/317.9, 516, 910

[56] References Cited

U.S. PATENT DOCUMENTS

| 4,438,175 | 3/1984 | Ashcraft et al. | 428/317.9 |
| 4,632,869 | 12/1986 | Park et al. | 428/317.9 |
| 4,734,324 | 3/1988 | Hill | 428/317.9 |
| 4,741,950 | 5/1988 | Liu | 428/317.9 |

Primary Examiner—William J. Van Balen
Attorney, Agent, or Firm—Bacon & Thomas

[57] ABSTRACT

The invention concerns polymeric films, in particular, but not exclusively, in the form of synthetic paper. The films have a rough surface provided by a blend of a first polymer having a melt flow index of not more than 1 g/10 mins as measured by ASTM D1238/73 (condition L) with at least one polymer chemically incompatible with the first polymer. The first polymer preferably does not flow under these conditions, and the incompatible polymer preferably has a melt flow index of from 4 to 50 g/10 mins under ASTM D1238/73 (condition L). The polymers of each layer are preferably polyolefins. The base layer is of voided polypropylene. The rough surface can provide writeability, or it can be printed or metallized to provide a unique appearance.

12 Claims, No Drawings

POLYMERIC FILMS

This invention concerns polymeric films, in particular, but not exclusively, in the form of synthetic paper.

It has been proposed hitherto to prepare synthetic paper from polyolefins, especially polypropylene, for example by including a filler in the polymer which is oriented to produce a film having voids in its interior and surface roughness which provides a writeable surface.

However, the large amounts of filler required to produce a writeable surface adversely affect the physical properties of the film itself. Thus such films have poor stiffness combined with low tensile strength if opacity and more particularly writeability are increased by the addition of more filler.

According to the present invention there is provided an oriented polymeric film comprising a base layer of voided polypropylene having a writeable layer thereon, the writeable layer comprising a blend of a first polymer having a melt flow index of not more than 1 g/10 mins under ASTM D1238/73 (condition L) and at least one polymer chemically incompatible therewith.

Films of the present invention surprisingly not only have a writeable surface combined with particularly good opacity but they have shown good stiffness and tensile strength when compared with films having a filler throughout the thickness of the film or high levels of core filler. Furthermore, such films of the invention have shown low permeability to gases when compared with hitherto proposed synthetic papers. This makes films of the present invention of especial value as packaging films, particularly as layers of the blend are in general heat sealable to themselves.

The unique decorative appearance of films of the present invention can also be modified by metallising the layer of the blend of polymers. This can have the effect of producing, for example, an anodised appearance.

If printing is applied to the layer of the blend of polymers, a unique, intensely matt surface can be achieved.

The films of the present invention have a rough surface provided by a blend of chemically incompatible polymers, and this is achieved without the use of a filler in the writeable layer.

The blends should contain a polymer with a melt flow index of not more than 1 g/10 mins under ASTM D1238/73 (condition L), and preferably this polymer should not flow under these conditions. Polyethylene can be used for the purpose, for example polyethylene having a density of from $0.920$ g/cm$^3$ to $0.970$ g/cm$^3$, and preferably about $0.936$ g/cm$^3$.

Chemical incompatibility can be provided in the blends by the use of a polymer containing units derived from at least one of ethylene, propylene and but-1-ene provided that the polymer is compatible, i.e. it should not be polyethylene or a polymer which includes sufficient ethylene based units to impart compatibility. Examples of suitable polymers which are incompatible with polyethylene include polypropylene, co-polymers of propylene or but-1-ene with ethylene, and terpolymers of propylene with ethylene and but-1-ene.

It is preferred that the melt flow index of the incompatible polymer in the blend is from 4 to 50 g/10 mins under ASTM D1238/73 (condition L), especially from 6 to 15, advantageously about 8g/10 mins. The density of the incompatible polymer is preferably not less than $0.900$ g/cm$^3$.

The blend used to form the writeable layer will usually contain from 25 to 75 weight percent of the first polymer having a melt flow index of not more than 1 g/10 mins. under the specified conditions.

Although the present invention provides films having a writeable surface without the use of a filler in the writeable layer, in particular writeability with ball-point pen or felt-tip pen, pencil writeability can be improved by the inclusion of a small amount of filler particles. Good pencil writeability can be obtained by the inclusion of up to 5 weight percent of organic or inorganic filler particles, based on the weight of the writeable layer. An example of inorganic filler particles which can be used is finely divided silica. In order to enhance writeability, the particle size of the filler particles is preferably greater than the thickness of the writeable layer.

The base layer is of voided polypropylene. Voiding can be effected in known manner by orientating polypropylene containing an organic or inorganic voiding agent, for example chalk particles, of a particle size, e.g. of 1 to 10 microns. Typically the amount of voiding agent present will be from 1 to 30 percent by weight of the base layer.

The thickness of the base layer can be selected as desired for a particular end use of the film. Examples of suitable thicknesses are from 15 to 55 microns, e.g. about 37 microns thick. The writeable layer is preferably from 0.5 to 10 microns thick, more particularly from 1 to 5 microns thick, and advantageously from 2 to 4 microns thick. When filler particles are included in the writeable layer, they are preferably up to 10 microns in diameter.

Writeability with ball-point pen can be improved by a surface treatment, for example corona discharge.

Films of the present invention can be used as a packaging film. The films can include a third polymer layer on the base layer. This further layer can be selected for example to promote acceptance of an adhesive layer, e.g. for label stock or cold seal acceptance for packaging use, or to impart printability and/or heat sealability to the surface of the film opposite the writeable layer. Examples of suitable third layers include polymers containing units derived from at least two of ethylene, propylene, but-1-ene, an acrylic ester, acrylic acid and maleic anhydride. Typically the third layer will be from 0.6 to 2 microns thick. The third layer can be corona discharge treated to aid adhesion of a subsequently applied adhesive layer. However, if a third layer is not used, it will generally be necessary to provide a primer layer if an adhesive layer is to be used.

Films of the present invention can be produced in known manner by orienting a film consisting of a polypropylene base layer and a layer of the blend thereon. Advantageously this is effected by coextruding these layers to form a composite film which is thereafter stretched in the machine direction, for example from 4.5 to 7:1, advantageously 5:1, and thence in the transverse direction, for example from 9 to 10:1.

When a third polymeric layer is used, it can be formed by coextrusion of a three layer composite film which is thereafter biaxially oriented, for example under the above stretching conditions.

Films of the present invention can, when provided with a third polymeric layer, be subjected to further treatment steps, for example they can be metallised in known manner, or they can be provided with printed indicia. Films which have been treated in such a manner can be used as packaging materials.

The following Example is given by way of illustration only. All parts are by weight unless stated otherwise, and all melt flow index values are measured under ASTM 1238/73 (condition L).

EXAMPLE

A three-layer film web was produced by coextruding a base layer of polypropylene homopolymer containing 6% calcium carbonate with an average particle size of 3 microns with on one face a dispersion of 2.5% silica of 10 micron average particle size, 47.5% of polyethylene having a melt flow index of 0.12 g/10 min and 50% of a copolymer of ethylene and propylene having a melt flow index of 8 g/10 minutes containing about 4% of units derived from ethylene, and on the other face a layer of the above ethylene/propylene copolymer. The web was cooled on a chill roll and thereafter stretched 4.5:1 in the machine direction and subsequently 10:1 in the transverse direction, corona discharge treated and wound up.

The resultant film had a total thickness of 43 microns, with the layer of blend being about 2 microns thick and the layer on the opposite face being 1.5 microns thick. The overall density of the film was 0.690 g/cm$^3$.

The surface containing the silica showed good ballpoint pen and pencil writeability, with a high degree of mattness giving a quality paper feel to the film.

The surface containing the silica was printed after which it has an intensely matt appearance.

I claim:

1. An oriented polymeric film comprising a base layer of voided polypropylene having a writeable layer thereon, the writeable layer comprising a blend of a first polymer having a melt flow index of not more than 1 g/10 mins under ASTM D1238/73 (conditions L) and at least one polymer chemically incompatible therewith.

2. A film according to claim 1, wherein the first polymer is a polyethylene.

3. A film according to claim 2, wherein the polyethylene has a density of from 0.920 g/cm$^3$ to 0.970 g/cm$^3$.

4. A film according to claim 1, wherein the blend includes a chemically incompatible polymer having a melt flow index of from 4 to 50 g/10 mins under ASTM D1238/73 (condition L).

5. A film according to claim 4, wherein the chemically incompatible polymer has a melt flow index of about 8 g/10 mins under ASTM D1238/73 (condition L).

6. A film according to claim 4, wherein the chemically incompatible polymer contains units derived from at least one of ethylene, propylene and butene-1, and is other than an ethylene homopolymer.

7. A film according to claim 1, wherein the blend comprises from 25 to 75 weight percent of the first polymer based on the total weight of the blend.

8. A film according to claim 1, wherein the writeable layer includes up to 5 weight percent of organic or inorganic filler particles dispersed therein based on the weight of the layer.

9. A film according to claim 1, having a third polymeric layer on the base layer.

10. A film according to claim 1, having an adhesive layer or cold seal on the base layer or on the third polymeric layer when present.

11. A film according to claim 1, in the form of a packaging film.

12. A film according to claim 1, in the form of a synthetic paper.

* * * * *